(No Model.)

R. D. MAUND.
FRUIT GATHERER'S COAT.

No. 494,875. Patented Apr. 4, 1893.

WITNESSES:
J. H. Thiebrath
E. M. Clark

INVENTOR
R. D. Maund
BY Munn & Co.
ATTORNEYS.

UNITED STATES PATENT OFFICE.

ROBERT D. MAUND, OF GENEVA, GEORGIA.

FRUIT-GATHERER'S COAT.

SPECIFICATION forming part of Letters Patent No. 494,875, dated April 4, 1893.

Application filed April 29, 1891. Renewed September 24, 1892. Serial No. 446,773. (No model.)

*To all whom it may concern:*

Be it known that I, ROBERT D. MAUND, of Sycamore, in the county of Irwin and State of Georgia, now of Geneva, Georgia, have invented a new and Improved Fruit-Gatherer's Coat, of which the following is a specification, reference being had to the annexed drawings, forming a part thereof, in which—

Figure 1:
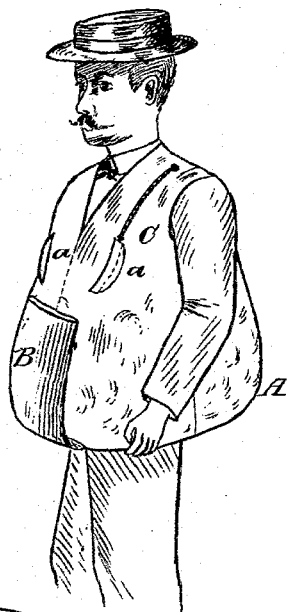
Figure 2:
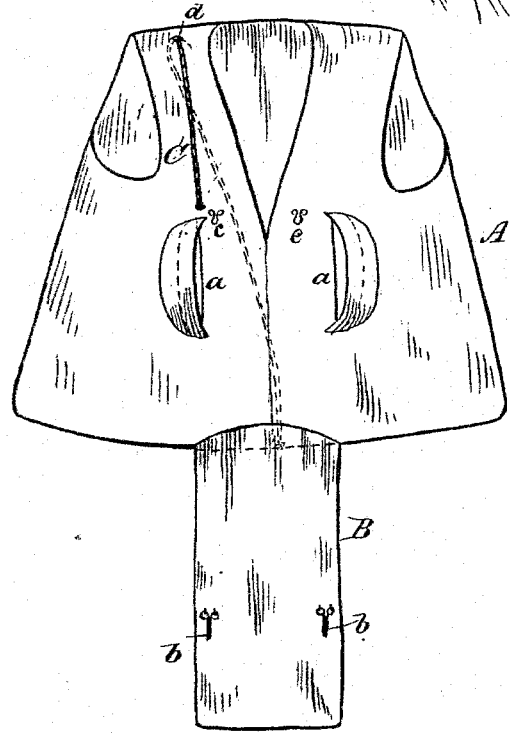
Figure 3:
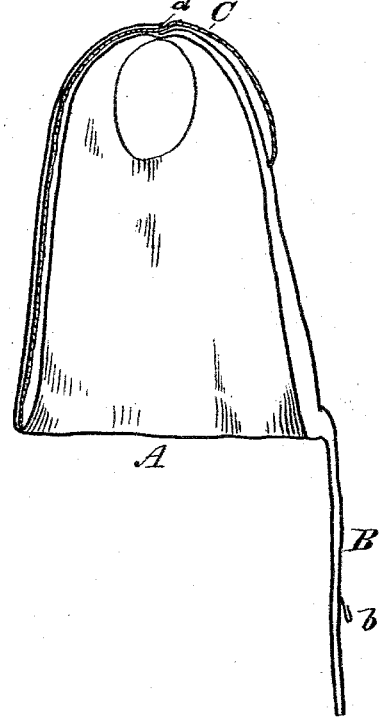

Figure 1 is a perspective view, showing my improved fruit-gatherer's coat in use. Fig. 2 is a front elevation of the same; and Fig. 3 is a vertical transverse section.

Similar letters of reference indicate corresponding parts in all the views.

The object of my invention is to provide a garment furnished with a receptacle for containing fruit, and a spout for discharging the same into a basket.

The garment A, is made to surround the body of the wearer, and to extend over the shoulders so that the shoulders may bear the weight of the contents of the garment. The garment is preferably made without sleeves, and it is made double throughout, forming a receptacle between the inner and outer parts for receiving the fruit. The front of the garment is furnished with pocket-holes $a$, which lead into the space between the inner and outer portions of the garment, and through which the fruit is introduced into the said space.

The lower part of the front of the garment is provided with a flexible spout B, for discharging the fruit. The said spout is furnished with hooks $b$, which are inserted in the eyes $c$, while the space in the garment is being filled, but when it is desired to discharge the fruit from the garment into a basket or other receptacle, the spout B is unhooked and lowered, and the fruit is allowed to pass through it into the basket.

To facilitate the discharge of the fruit from the garment, a cord C passes through an eyelet $d$ and over the shoulder, down the back, and is attached to the lower part of the rear portion of the garment. By drawing the cord C, the rear portion of the garment is elevated so as to cause the fruit to roll around to the front part and be discharged through the spout B.

By means of my improved garment, more fruit can be picked without injury than by other known devices, and it can be handled with more convenience by the picker.

Having thus described my invention, I claim as new and desire to secure by Letters Patent—

1. A fruit gatherer's coat, consisting of a sleeveless coat made double throughout to form a receptacle between the inner and outer portions of the coat, and provided with pocket holes in its front, and with a spout leading from its lower front portion, substantially as herein shown and described.

2. A fruit gatherer's coat, formed of a double garment provided with pocket-holes, a discharge spout, and a cord C for facilitating the discharge of the fruit, substantially as specified.

ROBERT D. MAUND.

Witnesses:
E. L. PITT,
C. W. COOPER.